K. HINO.
CYCLE CAR.
APPLICATION FILED FEB. 11, 1919.
1,306,483.
Patented June 10, 1919.
Fig. 1.
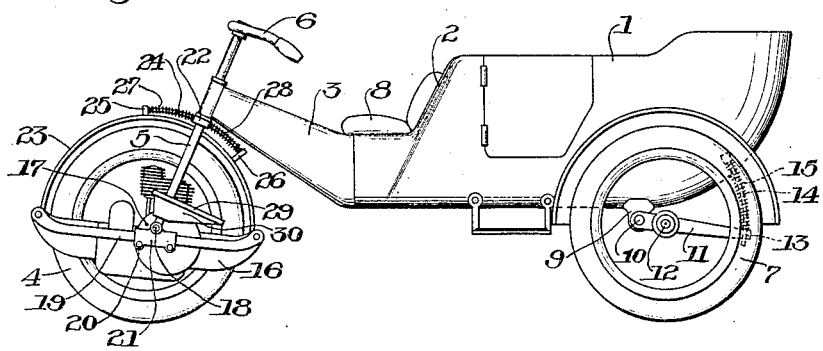
Fig. 2.
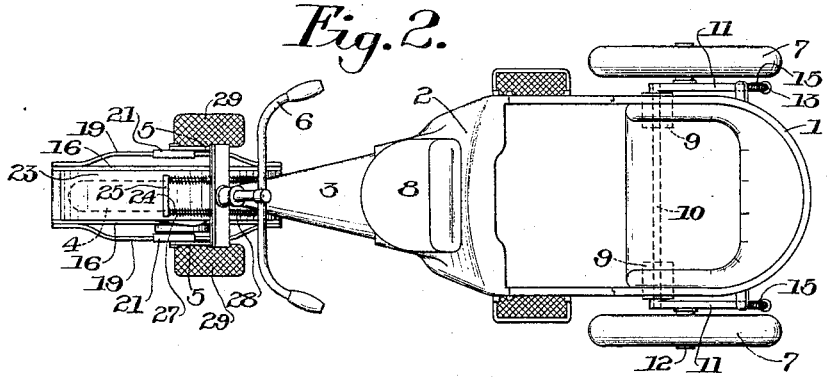
Fig. 3.
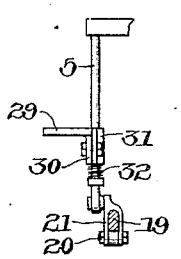
Fig. 5. Fig. 4.
Fig. 6.
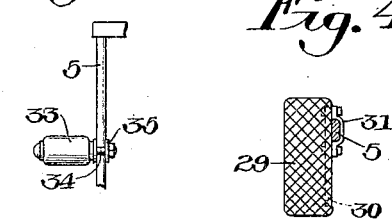
INVENTOR:
Kumazo Hino
BY Wm Wallace White
ATTY.

UNITED STATES PATENT OFFICE.

KUMAZO HINO, OF TOKYO FU, JAPAN.

CYCLE-CAR.

1,306,483. Specification of Letters Patent. Patented June 10, 1919.

Application filed February 11, 1919. Serial No. 276,326.

*To all whom it may concern:*

Be it known that I, KUMAZO HINO, subject of the Emperor of Japan, residing at #480 Sendagaya, Sendagaya Machi, Toyotama Gun, Tokyo Fu, Japan, have invented new and useful Improvements in Cycle-Cars, of which the following is a specification.

This invention relates to a self-propelled cycle-car in which a seat box of light construction is mounted on the two rear wheels, a rotatable shaft being passed through bearings fixed to the seat box, which shaft having fixed at each end an arm extending backward along the seat box, the free end of the said arm being pressed downward by a helical spring attached to the seat box, and near the junction with the shaft, having an axle for a rear wheel; a front frame having a seat for the chauffeur provided over it, is firmly fixed to the seat box; a steering rod passes through the front end of the said front frame, the fork of the said rod having foot-rests for the chauffeur; the front wheel is not mounted on the fork but on a frame to which the said fork is pivoted near the axle of the front wheel; and one of the three wheels serves as the motor wheel, or a separate motor wheel is attached to any one of them.

The object of this invention is to obtain a self-propelled cycle car of simple construction which is safe and comfortable, being provided with a seat box for the rider and simple and efficient means for deadening the shock and also with a seat and foot rests for the chauffeur.

The accompanying drawings show a cycle car embodying my invention of which—

Figure 1 is a side view.

Fig. 2 is a plan of Fig. 1 removing the mud guard.

Fig. 3 is a back view of one half of the fork with attachments.

Fig. 4 is a plan view of the foot-rest.

Fig. 5 is a back view of one half of the fork with a modified form of foot-rest attached thereto; and Fig. 6 is a sectional plan of Fig. 5.

The same reference numbers designate the same or corresponding parts throughout all the figures.

The seat-box (1) for the rider is constructed like that of the side car of an autobicycle, with the front side closed. A separate front frame (3) is firmly fixed to the front side (2) of the seat-box (1); and thus a rigid car body is constructed. At the front end of the front frame (3) is provided a steering rod which sustains a front wheel, the said steering rod having a fork (5) at the lower end and a handle at the top like the steering rod of a bicycle or autobicycle. Thus the car body is supported upon two rear wheels and a front wheel which lies in the median line of the two rear wheels. One of the two rear wheels or the front wheel serves as a motor wheel, being provided with an internal combustion engine; or a separate motor wheel may be attached to the rear center of seat-box as a pusher. In the accompanying drawing, the front wheel is represented as a motor wheel; and the devices for controlling the engine are installed on the handle-bar of the steering rod.

In front of the front side (2) of the seat-box (1) and above the front frame (3) is provided a seat (8) for the chauffeur.

The seat-box has at its bottom two axle bearings (9) through which a shaft (10) passes. The shaft (10) has at each end firmly fixed thereto an arm (11) which extends backward along the box. The free end of each arm (11) has a hole through which a curved rod (14) fixed at each side of the box passes, and around this curved rod (14) is provided a helical spring (15) which presses downward the free end of each arm (11). The curved rods (14) may, however, be dispensed with, and only the helical springs may be used. The rear wheels (7) do not turn on the shaft (10) but on an axle (12) fixed to each arm near the place which the arm joins the shaft. By such arrangement the seat-box (1) can be mounted on the rear wheels (7) lower than when it is mounted directly thereon through springs, and also, the object of deadening shock can be achieved with weaker springs. Moreover, by thus making the rear wheels turn not on the shaft but on the axles fixed eccentrically on the common shaft, the wheels make the synchronized up and down movements by the crank motions, and the lateral stability of the vehicle on the uneven ground is effectively maintained.

To decrease the weight of the car as far as possible, two short shafts may be used in place of one, each of which shafts turn in the bearing on each side of the car.

The front wheel (4) is not directly pivoted on the lower part of the forked steering rod (5), but is mounted on a front wheel frame (16), the forked end of the steering rod being connected with the front wheel frame a little behind the center of the front wheel in the following manner. In order that the position of the point (18) where the fork is pivoted on the front wheel frame may be adjusted with respect to the center (17) of the front wheel, the fork is pivoted on two pieces (21) which can be moved on, and can be firmly secured by means of screws (20), to two rods (19) which are fixed to the front wheel frame, one on each side. Now, when running on an uneven road the front wheel strikes against any protuberance, the center (17) thereof will be pushed up with respect to the pivot (18); in other words, the wheel together with its frame (16) will turn backward on the pivot (18). As a means to counteract this jumping motion of the front wheel, a spring may be provided between the rear part of the front wheel frame and the crown (22) of the steering rod, the said spring pushing down the frame end, but it is better to utilize for this purpose the mud guard (23) which is firmly jointed to the fore and rear parts of the front wheel frame. As is shown in the figures, a curved rod (24), the curvature of which is that of a circle described with (18) as the center, or near thereto, is provided along the mud guard, passing it through the crown of the steering rod or a metal fitting thereof, and the two ends thereof being firmly secured to the mud guard (23). Between the steering rod and the two extremities (25) (26) of the curved rod are provided two helical springs (27) (28) around the said curved rod (24). Then jumping up motion of the front wheel will be counteracted by the springs (27) and the opposite motion, by the springs (28); and the shock to the car body caused by concussion of the front wheel will be effectively absorbed. Moreover, as the distance between the pivot (18) and the center (17) of the front wheel is very much smaller than that between the pivot (18) and the springs, the object of deadening shock can be achieved with comparatively weaker springs. Furthermore, the distance between the pivot (18) and the center (17) of the front wheel can be adjusted according to the weight and speed of the car, and condition of the roads.

The foot-rest (29) consists of a board the side at which it is to be fixed to the fork being bent down. The bent down part (30) together with a metal fitting (31) attached thereto, incloses a tine, and may be firmly secured as is shown in Fig. 1; but it may be left loose and supported from below with a spring (32) so that the shock caused by the concussion of the front wheel may be deadened and may not be felt by the chauffeur.

Figs. 5 and 6 show a modification of the foot rest which consists of a cylindrical tube (33) of india rubber, leather or any such elastic substance through which a rod (34) passes, the said rod being secured to a tine of the fork by means of a U shaped metal fitting (35) which incloses the tine and is secured thereto by means of nuts.

In a cycle car, if a frame extending over the rear and front wheels be constructed and seats for the rider and chauffeur be provided upon such a frame, the height of the car becomes very great and consequently it is not stable. In order to remove this disadvantage I have contrived to construct a compact car body, to be directly mounted upon the wheels without any supporting frame, by rigidly connecting a front frame to a seat box, thus materially decreasing the height of car and consequently making it stable. Further, according to my invention, unlike a bicycle having a side car, as the weight lies at the center, it is easier to steer as when to turn a corner, besides the resistance of air is less. Furthermore, as the shock killing devices being very efficient, the car is very comfortable, and as the seat of the chauffeur is comparatively lower, he can, when necessary, rest his feet on the ground, and when driving he can put his feet on the foot-rests and assist the steering with them.

I claim:

1. A cycle car consisting of a seat box of a light construction like that of the side car of an auto-bicycle; a front frame firmly fixed to the forward side of the said seat box and extending forward, a front wheel mounted on a forked steering rod which passes through the forward end of the said front frame; a shaft provided at the back part of the said seat box; arms extending backward one from each end of the said shaft; rear wheels turning on the axles provided one on each one of the said arms; springs which are fixed to the said seat box and which push down the free ends of the said arms, and a seat for the chauffeur provided above the aforesaid front member substantially as and for the purposes hereinbefore set forth.

2. In a cycle car of the kind hereinbefore described, a shock absorbing device consisting of a frame which sustains a front wheel; a forked steering rod pivotally connected with the said front wheel frame at a place backward of the center of the said front wheel; a mud guard for the front wheel, and springs which lying between the said front wheel mud guard and the crown of the said forked steering rod, tend to maintain the normal position and absorb the shocks, substantially as and for the purposes hereinbefore set forth.

3. In a cycle car of the kind hereinbefore described a shock absorbing device consisting of a frame which sustains a front wheel; a mud guard therefor; two rods provided one on each side of the said front wheel frame; movable pieces which can be moved over the said rods and firmly fixed; a forked steering rod, the lower forked ends of which are pivoted on the said movable pieces; and springs which lying between the said front wheel mud guard and the said forked steering rod, maintain the normal position and absorb the shocks, substantially as and for the purposes hereinbefore set forth.

4. In a cycle car of the kind hereinbefore described a shock absorbing device consisting of a frame which sustains a front wheel; a steering rod the lower forked ends of which are pivoted on the said front wheel frame at a place backward of the center of the said front wheel; a mud guard for the front wheel; a curved rod extending between the forked end of said steering rod, and the two ends of which are firmly connected with the mud guard of the said front wheel; and helical springs provided around the said curved rod between the steering rods and the forward and backward ends of the said curved rod, substantially as and for the purposes hereinbefore set forth.

5. A cycle car consisting of a seat box; a front frame firmly fixed to the forward side of the said seat box and extending forward; a front wheel mounted on a forked steering rod, provided at the forward end of the said front frame; rear wheels provided one on each side of the back part of the seat box; a seat for the chauffeur provided over the front frame; and foot-rests attached to the forked steering rod, substantially as and for the purposes hereinbefore set forth.

6. A cycle car consisting of a seat box; a front frame firmly fixed to the said seat box extending forward; a front wheel mounted on a fork steering rod provided at the forward end of the said front frame; rear wheels on opposite sides of the back part of the said seat box; a seat for the chauffeur provided over the said front frame; foot-rests which can be moved upward or downward, attached to the said forked steering rod; and springs which support the said foot-rests, substantially as and for the purposes hereinbefore set forth.

7. A cycle car consisting of a seat box; a front frame firmly attached to the said seat box and extending forward; a forked steering rod provided at the forward end of the said front frame; a front wheel; a front wheel frame which sustains the front wheel and to which are pivoted the lower ends of the forked steering rod at a place backward of the center of the said front wheel; springs which lying between the said forked steering rod and the said front wheel frame tend to maintain the normal position; rear wheels provided one on each side of the back part of the seat box; a seat for chauffeur provided over the front frame; and foot rests attached to the forked steering rod; substantially as and for the purposes hereinbefore set forth.

8. A cycle car consisting of a seat box of a light construction like that of the side car of an auto-bicycle; a front frame firmly fixed to the forward side of the said seat box and extending forward; a forked steering rod provided at the forward end of the said front frame; a front wheel; a front wheel frame which sustains the said front wheel and to which the lower ends of the said forked steering rod are pivoted at a place backward of the center of the said front wheel; a curved rod extending between the forked end of said steering rod and the two ends of which are firmly connected with the mud guard of the said front wheel; helical springs provided around the said curved rod between the steering rod and the forward and backward ends of the said curved rod; a shaft provided at the back part of the said seat box; arms projecting backward from the ends of the said shaft; rear wheels which turn on the axles provided on the said arms; springs which push down the ends of the said arms, attached to the seat box; a seat for the chauffeur provided over the front frame; and foot-rests provided on the said forked steering-rod; substantially as and for the purposes hereinbefore set forth.

In testimony whereof I have signed my name to this specification.

KUMAZO HINO.

Copies of this patent may be obtained for five cents each, by addressing the "Commissioner of Patents, Washington, D. C."